US006717168B2

(12) United States Patent
Eisen et al.

(10) Patent No.: US 6,717,168 B2
(45) Date of Patent: Apr. 6, 2004

(54) DEVICE FOR DETECTING THE MARGINAL EDGE AND MARKING OF A MOVING WEB OF MATERIAL

(75) Inventors: Juergen Eisen, Augsburg (DE); Harald Heim, Augsburg (DE)

(73) Assignee: Erhardt Leimer GmbH, Augsburg (DE)

( * ) Notice: Subject to any disclaimer, the term of this patent is extended or adjusted under 35 U.S.C. 154(b) by 209 days.

(21) Appl. No.: 09/851,225

(22) Filed: May 8, 2001

(65) Prior Publication Data

US 2001/0042847 A1 Nov. 22, 2001

(30) Foreign Application Priority Data

May 10, 2000 (DE) ........................................ 100 22 597

(51) Int. Cl.[7] ................................................ G01V 8/00
(52) U.S. Cl. .............................. 250/559.36; 250/559.44
(58) Field of Search ....................... 250/559.24, 559.29, 250/559.36, 559.39, 221, 223 R, 205, 216, 559.44; 356/429–431, 238.2

(56) References Cited

U.S. PATENT DOCUMENTS 3,892,492 A * 7/1975 Eichenberger .............. 356/429
4,184,080 A * 1/1980 Massey .................. 250/559.36
4,972,093 A * 11/1990 Cochran et al. ........ 250/559.39
5,013,927 A * 5/1991 Tsikos et al. ........... 250/559.29
5,684,530 A * 11/1997 White .......................... 348/131
5,767,975 A * 6/1998 .ANG.hlen .............. 250/559.39
6,482,222 B1 * 11/2002 Bruckheimer et al. ....... 606/200

FOREIGN PATENT DOCUMENTS

DE     195 19 607     12/1996
DE     197 25 633     12/1998

* cited by examiner

Primary Examiner—Georgia Epps
Assistant Examiner—Alicia M. Harrington
(74) Attorney, Agent, or Firm—Collard & Roe, P.C.

(57) ABSTRACT

A device for detecting the marginal edge or a marking of a material web. The device contains an optical sensor and two light sources associated with the optical sensor. The first light source emits directed light beams and aims such beams at the material web. The first light source is formed by a plurality of light-emitting diodes, arranged such that the light reflected by the material web in a diffused manner cannot be detected by the optical sensor. A second light source is also associated with the optical sensor. The second light source contains a diffuser disk. The diffuser disk generates diffused light that is emitted in all three-dimensional directions. When the second light source is active, the condition of reflection is satisfied so that it is possible to scan the material web having mirror-like reflection.

20 Claims, 2 Drawing Sheets

DEVICE FOR DETECTING THE MARGINAL EDGE AND MARKING OF A MOVING WEB OF MATERIAL

CROSS REFERENCE TO RELATED APPLICATIONS

Applicants claim priority under 35 U.S.C. §119 of German Application No. 100 22 597.7 filed May 10, 2000.

BACKGROUND OF THE INVENTION

1. Field of the Invention

The invention relates to a device for detecting the marginal edge and marking of a moving web of material.

2. The Prior Art

A device for detecting markings on a moving web of material is known from German Patent Application No. 195 19 607 A1. This device detects lines imprinted on webs of material. These lines correctly guide the web of material and align the treating devices such as the cutting devices. This is important when the edges of the material web do not extend in a clean manner, or have an imprinted image that is not properly aligned with the edges of the web.

This known device comprises a CCD camera that optically scans a defined area of the material web. A light source is associated with the CCD camera, and the light is aimed at the area of the material web that is being scanned by the camera. The light source and the camera are aligned in relation to one another such that the camera exclusively receives light that is diffusely reflected by the material web to avoid glare effects. However, this known device has the disadvantage that material webs having a mirror-like reflection (webs provided with dark markings) do not supply an adequate contrast to the camera, thereby making scanning markings very difficult.

SUMMARY OF THE INVENTION

An object of the present invention is to provide a detecting device that can be used to detect the marginal edge or markings on a moving material web.

These and other objects are accomplished by providing a detecting device comprising at least one optical sensor for scanning the material web transversely in relation to its moving direction. A CCD camera is provided as the sensor for generating a two-dimensional image of a defined area of the material web. However, due to the constant movement of the material web in the running direction, it is sufficient to use a CCD line camera that only scans a pixel line extending transversely to the moving direction of the web. The given position of the marking extending longitudinally in relation to the material web can be detected at any time. The CCD-line camera offers the advantage that the information it supplies can be evaluated in a simpler manner and thus more rapidly. This allows the individual measuring cycles to follow each other more closely in time.

At least two light sources are associated with the optical sensor for illuminating the area of the material web being scanned by the optical sensor. One of the two light sources generates a substantially directed light and the other generates a diffused light. The two light sources can be used alternately or at the same time to safely scan markings on webs of different materials. If the material web contains a very rough surface, the impacting light is substantially reflected in a diffused manner, so that the light source generating a directed light is preferred.

Because of its directional effect, the light source generates a narrowly defined speck of light on the material web that can be easily coordinated with the detection range of the optical sensor. This allows the light emitted by the light source to be optimally exploited. To keep interfering reflections of the material web away from the optical sensor, the light source is aligned with respect to the material web and to the optical sensor such that the condition of reflection is not satisfied, i.e. the light beam reflected by the material in a mirror-like manner will bypass the optical sensor. On the other hand, for scanning material webs having a mirror-reflection, a diffused light source is used because the light is emitted from the area where it exits from the light source in all different directions. The condition of reflection of which an angle between the light source and the material web has to be equal to the angle between the optical sensor and the material web is always satisfied for any one of the diffusely emitted beams of light. This allows the surface of the material web having a mirror-like reflection to appear bright in the optical sensor. On the other hand, markings applied to the surface that have a mirror-like reflection (markings that are dark or are reflected in a diffused manner) appear dark so that an adequate contrast is available for detecting such markings. The use of diffused light results in the advantage that the light source and the optical sensor can be aligned with respect to the material web within a broad angular range. Therefore, corrective adjustments of the device with respect to the material web can be dispensed with. In material webs that are very difficult to detect, such as textiles with interspersed metal threads, an applied marking may not supply an adequate contrast with directed or diffused light. In such cases, the applied marking can still be detected with adequate contrast by simultaneously irradiating the material web with both directed and diffused light and the angular position between the device and the material web is not critical.

For simple generation of diffused light, it is advantageous if the light source contains a diffuser disk. The diffuser disk is fully illuminated so that the light is scattered from each point of the diffuser disk in three-dimensional directions. Therefore, the scattered light is optimally diffused and is used for scanning material webs having a mirror-like reflection.

In the textile and paper industries, it is necessary to reliably protect the light sources and the optical sensor against dust and similar elements. This is accomplished by providing a transparent cover that covers both the sensor and the light sources. To form the diffuser disk, the part area of the cover emitting diffused light is provided with a rough surface. The cover is preferably made of glass or a transparent plastic and the rough surface is produced by etching.

To achieve uniform illumination of the diffuser disk, the light source emitting diffused light contains a plurality of emitters. The number of emitters is dependent upon the size of the diffuser disk. The individual emitters generate light cones that overlap one another to further enhance the homogeneity of the diffused light.

The light cones of the emitters have opening angles of at least 45° to provide an adequate homogeneous illumination of the diffuser disk and consequently a good quality of the diffused light is generated. The light source can be structured in a compact manner.

To correctly coordinate the light emitted by the first light source that generates directed light, it is advantageous if the light source generates light cones having an opening angle of no more than 60°. The opening angle is preferably 45°, which results in a floodlight-like effect of the light source.

If light-emitting diodes are used as the light sources, the light source has a particularly long useful life and requires low energy consumption. Furthermore, light-emitting diodes have a very small light-emitting area so that unidirectional light can be generated with such LEDs. Moreover, light-emitting diodes can be rapidly switched on and off so that the change-over between the different light sources can be made very quickly.

To safely detect material webs of all colors and with all sorts of markings, it is favorable if the light sources emit multicolored light. Therefore, it is possible to even detect markings that are distinguished from the material web not only on account of their brightness, but exclusively by their color. If light-emitting diodes are employed as light sources, it is possible to use multicolor light-emitting diodes. Furthermore, light-emitting diodes with different colors next to each other can be used, and they are combined to form a common light source. However, it is preferred to use white light light-emitting diodes. These LEDs comprise a light-emitting diode emitting blue light and contain fluorescent substances in their housing. These fluorescent substances convert a portion of the blue light into light having a greater wavelength. This white light is produced in the superposition of the total light emitted. The use of white light offers the advantage that each marking that can be recognized by the naked eye is detected by the optical sensor as well.

For the purpose of detecting markings on very difficult material webs, such as webs of knitted materials interspersed with metal, it is advantageous if the light sources can be adjusted with respect to their brightness and mixed with one another. Therefore, it is possible to continually adjust the relative component of the diffused light in the total light so that a high contrast between the marking and the material web is produced.

To find the optimal mixing ratio between the light source emitting diffused light and the light source emitting directed light, a controlling device is connected to the light sources. This controlling device optimizes the contrast between the material web and the marking so that a person is not needed for such purpose. The controlling device is preferably a program-controlled microcomputer or microcontroller.

It may suffice to reverse between the two light sources and determine with the help of the signals supplied by the optical sensor in which case the contrast of the marking is stronger. The light source supplying the higher contrast is then selected while the system is in operation. However, if the two light sources are mixed with each other it is favorable if the mixing ratio of the two light intensities is determined by a successive approximation influenced by the contrast. Particularly when imprinted material webs are used, it may be difficult to separate the marking that has to be used for controlling or adjusting the run of the web from other imprints on the web. In this case, the device supplies a number of possible positions of the marking for which the correct one has to be selected by hand. To facilitate such a selection, it is favorable that the device is equipped with a light indicator projecting onto that position of the material web that corresponds with the marking found. The operator can easily check whether the position found corresponds with the relevant marking, and can instruct the device, for example by depressing keys, to control another found position. Therefore, safe follow-up of the marking is assured even under more difficult conditions.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
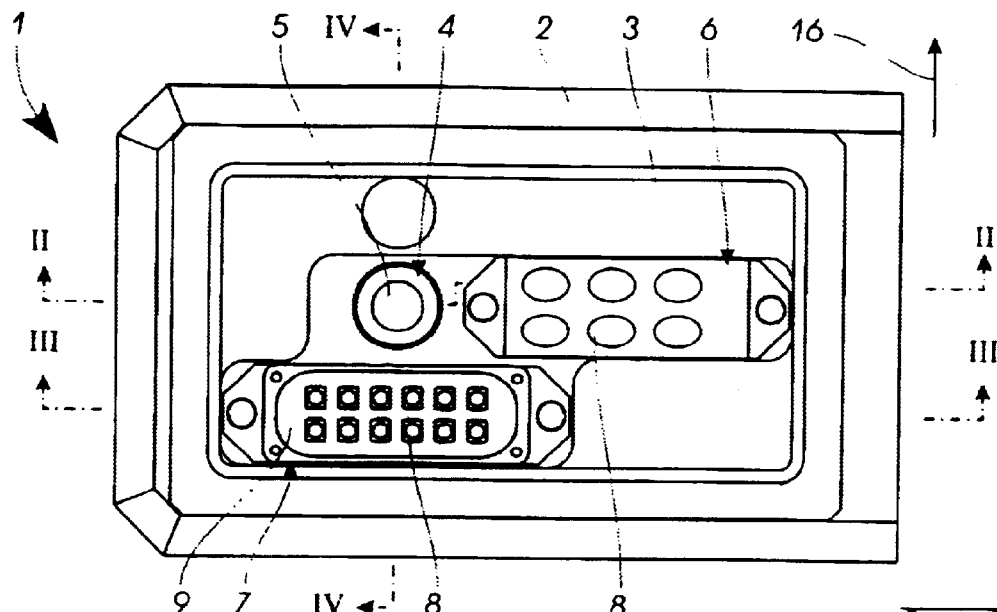
FIG. 1 shows a bottom perspective view of the detecting device according to the invention.

Referring now in detail to the drawings and, in particular, FIG. 1 shows a device 1 for detecting a marginal edge or a marking on a material web moving in a direction 16. Device 1 is formed by a housing 2 being closed on the bottom side by a transparent cover 3. In housing 2, an optical sensor 4 is provided and contains a lens 5. Optical sensor 4 detects a one-dimensional image of the material web for determining the position of the marginal edge or a marking provided on the material web.

To allow optical sensor 4 to receive an optical signal, the area of the material web scanned by optical sensor 4 has to be illuminated. Therefore, two light sources 6 and 7 are provided in housing 2. Two light sources 6 and 7 are structured in different ways.

First light source 6 comprises six light-emitting diodes 8 that substantially generate directed light and illuminate the scanned area of the material web. Second light source 7 comprises twelve light-emitting diodes 8 being aimed substantially vertical against transparent cover 3. Within the area of second light source 7, transparent cover 3 is provided with an etched, rough surface, so that transparent cover 3 forms a diffuser disk 9.

The light emitted by light-emitting diodes 8 of second light source 7 is scattered in three-dimensional directions by diffuser disk 9. Therefore, second light source 7 emits homogeneous diffused light. By selectively switching on first light source 6 or second light source 7 device 1 is adapted to different types of material webs so that an adequately high contrast is available in each case, between the material web and the marking.

Figure 2:
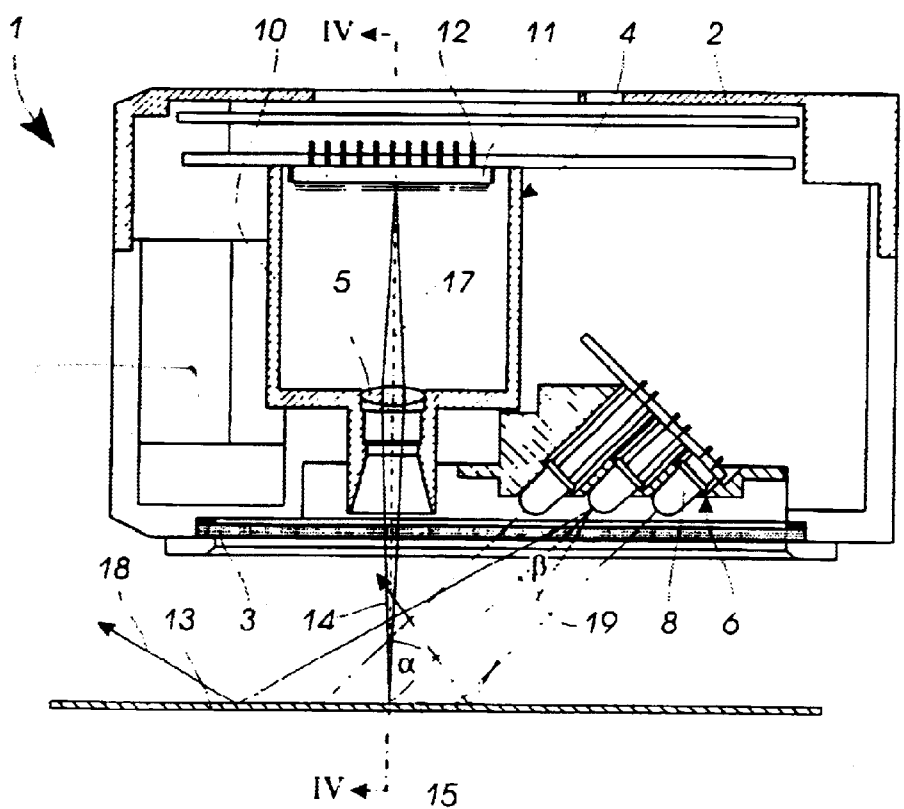
FIG. 2 is a sectional view of the device of FIG. 1 along section line II—II.

FIG. 2 shows a sectional view of FIG. 1 along the section line II—II. Optical sensor 4 comprises a cylindrical housing 10 containing a CCD-sensor 11. Therein CCD-sensor 11 contains a plurality of photodiodes, being arranged in a row. The photodiodes are read serially via an analog shift register and these signals are successively supplied to a serial output 12. The signals are proportional to the amount of light received by the photodiodes. Output 12 of CCD-sensor 11 provides a one-dimensional image of the brightness distribution of the area of material web 13 scanned by the sensor.

Furthermore, lens 5 reproduces light rays 14 being emitted by material web 13 on CCD-sensor 11. A marking 15 in the form of a bright or dark strip provided on material web 13, marking 15 preferably being imprinted on the web, is detected by CCD-sensor 11 and is emitted as a modulation of the output signal. Marking 15 extends in direction 16 shown in FIG. 2 as extending perpendicular to the plane of the image.

In FIG. 2, light-emitting diodes 8 of first light source 6 and an optical axis 17 of sensor 4 are joined to form an acute angle "α". This setting angle of light-emitting diodes 8 is approximately 45° and assures that light rays 14 mirror-reflected by material web 13 will travel pass the lens 5.

Light-emitting diodes 8 of first light source 6 emit light cones 19 having an opening angle "β" of about 30°. Opening angle "β" is the angle enclosed by the light rays of which the intensity dropped to half of the maximum value. By means of narrow light cones 19, the light emitted by light-emitting diodes 8 of first light source 6 is limited to a narrow area of material web 13. Due to the alignment of light-emitting diodes 8, the narrow area extends symmetrically around optical axis 17 of sensor 4. The six light-emitting diodes 8 of first light source 6 produce a narrow streak of light on material web 13 extending transversely in relation to direction 16 and substantially corresponds with the range of detection of optical sensor 4.

Figure 3:
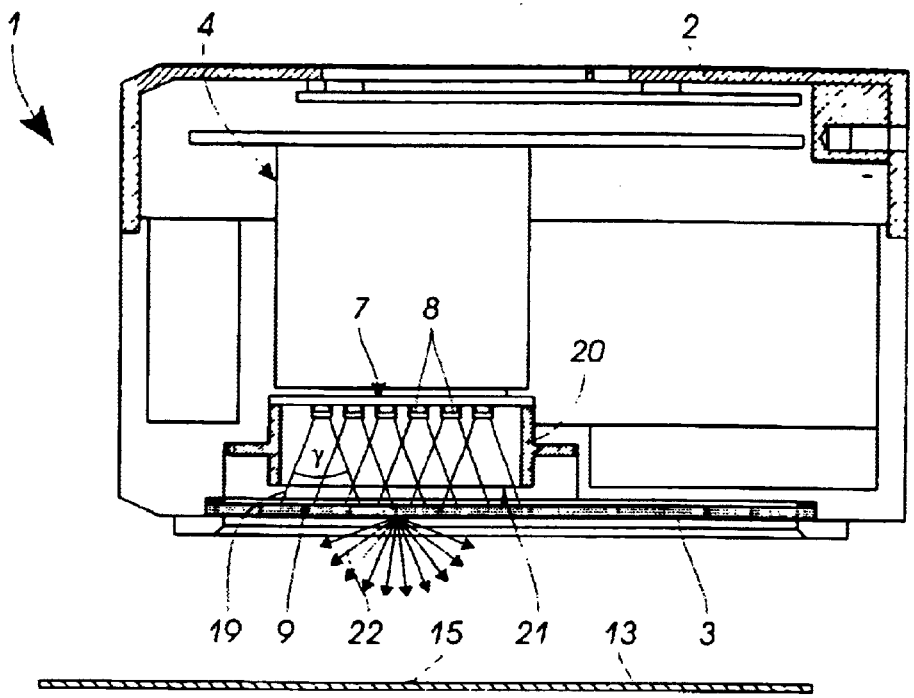
FIG. 3 is sectional view of the device of FIG. 1 along section line III—III.

The structure of second light source 7 is shown in FIG. 3. Light-emitting diodes 8 of second light source 7 are accommodated in a separate housing 20 located within housing 2. Light cones 19 emitted by light-emitting diodes 8 of second light source 7 have an opening angle "γ" of at least 45°, so that light cones 19 overlap one another within housing 20. Within the range of a lower end 21 of housing 20, the overall intensity of the emitted light is approximately constant over the entire sectional area of housing 20. This allows housing 20 to be homogeneously illuminated. With a small spacing from below lower end 21 of housing 20, transparent cover 3 is provided within the area located opposite housing 20. Cover 3 is designed in the form of a scattering disk 9. The light impacting scattering disk 9 is scattered in all three-dimensional directions, so that the light 22 emitted from the scattering disk 9 is diffused. This assures that each point of material web 13 scanned by optical sensor 4 is illuminated from different directions so that there is always a light beam available that satisfies the condition of reflection. Therefore, with light source 7 for diffused light switched on, material web 13 having mirror-like reflection appears bright in optical sensor 4. Therefore, marking 15 applied to material web 13 can be detected by optical sensor 4.

Figure 4:
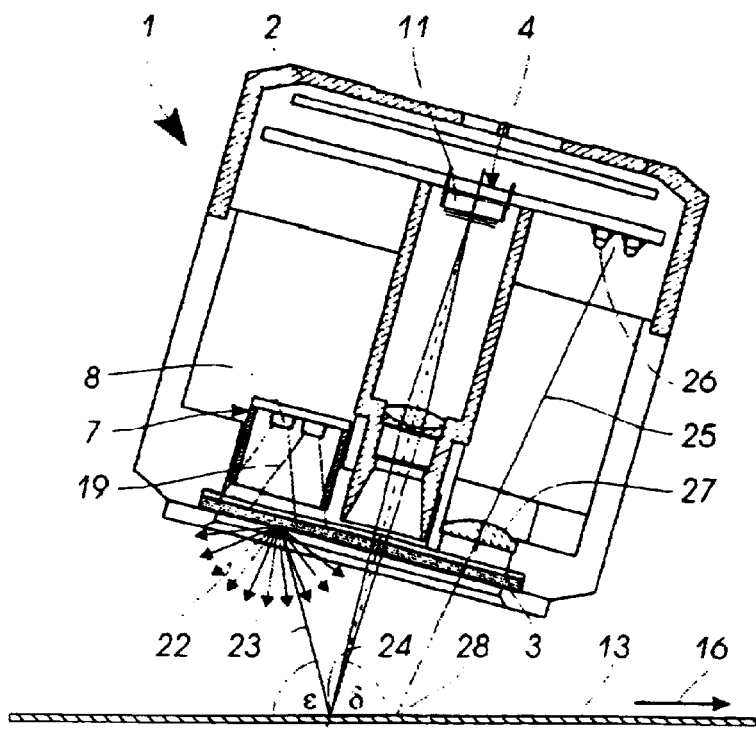
FIG. 4 is sectional view of the device of FIG. 1 along section line IV—IV.

FIG. 4 shows a sectional view of device 1 along the section line IV—IV showing second light source 7 with optical sensor 4. Second light source 7 is located within the immediate proximity of optical sensor 4. To satisfy the condition of reflection for material web 13, optical axis 17 of sensor 4 is adjusted at an acute angle "δ" in relation to the material web 13. Adjustment angle "δ" is about 75° and is selected such that the condition of reflection is satisfied. This occurs when a light beam coming from second light source 7 impacts a detection range 24 of optical sensor 4 on material web 13 at an angle "ε", which is equal to the setting angle "δ". Since second light source 7 has a certain expansion in width and scattered light 22 is emitted in three-dimensional directions, the condition of reflection is satisfied for a defined angular range. This means that high requirements are not needed for correctly aligning optical axis 17 with material web 13.

Finally, a light indicator 25 is arranged next to optical sensor 4. Light indicator 25 is formed by a number of red light-emitting diodes 26, which are arranged one after the other. The light emitted by light-emitting diodes 26 is reproduced by a lens 27 on material web 13 so that a line 28 is visible. An evaluation circuit (not shown) checks the signal emitted by optical sensor 4 for the presence of markings and the position found is indicated on material web 13 by switching on relevant light-emitting diodes 26.

Therefore, the operator can determine whether device 1 has correctly recognized marking 15 or is erroneously reading a feature of an image imprinted on material web as a marking. In that case, the operator can instruct the device, via keys (not shown), to use marking 15 located to the left or the right of actual indicator position 28. This process is repeated until light indicator 25 points at the correct marking 15, whose changes in position are subsequently supplied in the form of a signal.

Accordingly, while only a few embodiments of the present invention have been shown and described, it is obvious that many changes and modifications may be made thereunto without departing from the spirit and scope of the invention.

What is claimed is:

1. A device for detecting a marginal edge and a marking substantially extending in a longitudinal direction of a moving material web, comprising:
   at least one optical sensor directed at the material web for scanning the web transversely to the moving direction;
   at least one first light source associated with the optical sensor and being directed at an area on the material web so that the sensor exclusively detects light reflected by the material web in a diffused manner; and
   at least one second light source associated with the optical sensor for emitting diffused light comprising at least one diffuser disk, wherein the first light source and the second light source can be alternately employed and wherein the optical sensor and the first and second light sources are terminated by a common, transparent cover, said cover having a partial area comprising a rough, light scattering surface for forming said diffuser disk.

2. The device according to claim 1, wherein the second light source emitting diffused light comprises a plurality of emitters generating light cones overlapping one another.

3. The device according to claim 2, wherein said light cones comprise opening angles (γ) of at least 45°.

4. The device according to claim 1, wherein the first light source generates a light cone with an opening angle (β) of 60° or less.

5. The device according to claim 1, wherein at least one of the first and second sources comprises at least one light-emitting diode.

6. The device according to claim 1, wherein the first and second light sources emit multicolored light.

7. The device according to claim 1, wherein the first and second light sources contain a brightness that can be modulated.

8. The device according to claim 1, wherein the first and second light sources are mixed with each other.

9. The device according to claim 1, further comprising a controlling device actively connected to the first and second light sources for optimizing a contrast between the marking and the material web.

10. The device according to claim 1, further comprising a light indicator for projecting a position of the marking located onto the material web.

11. A device for detecting the marginal edge and a marking extending in a longitudinal direction of a moving material web, comprising:

at least one optical sensor directed at the material web for scanning the web transversely to the direction of the material web;

at least one first light source associated with the sensor and being directed on an area on the material web such that the sensor exclusively detects light reflected by the material web in a diffused manner;

at least one second light source associated with the sensor for emitting diffused light comprising at least one diffuser disk, wherein the first and second light sources are simultaneously employed; and a common transparent cover isolating the optical sensor and the first and second light sources said cover comprising in a part area a rough, light-scattering surface for forming said diffuser disk.

12. The device according to claim 11, wherein the second light source emitting diffused light comprises a plurality of emitters for generating light cones overlapping one another.

13. The device according to claim 12, wherein said light cones of said emitters comprise opening angles ($\gamma$) of at least 45°.

14. The device according to claim 11, where in the first light source generates a light cone having an opening angle ($\beta$) of 60 or less.

15. The device according to claim 11, wherein at least one of the first and second light sources comprises at least one light-emitting diode.

16. The device according to claim 11, wherein the first and second light sources emit multicolored light.

17. The device according to claim 11, wherein the first and second light sources comprise a brightness that can be modulated.

18. The device according to claim 11, wherein the first and second light sources are mixed with each other.

19. The device according to claim 11, further comprising a controlling device actively connected to the light sources for optimizing a contrast between the marking and the material web.

20. The device according to claim 11, further comprising a light indicator for projecting a position of the marking located onto the material web.

* * * * *